United States Patent [19]

Kraus

[11] Patent Number: 5,331,924

[45] Date of Patent: Jul. 26, 1994

[54] CATALYTIC LIQUID INJECTION SYSTEM FOR EMISSION CONTROL

[76] Inventor: Gregory A. Kraus, 7061 Atlantic Pl., Long Beach, Calif. 90805

[21] Appl. No.: 849,730

[22] Filed: Mar. 12, 1992

[51] Int. Cl.$^5$ ............................................ F02B 75/12
[52] U.S. Cl. ................................ 123/1 A; 123/25 A; 123/25 E
[58] Field of Search ................ 123/25 R, 25 A, 25 E, 123/1 A; 431/4; 44/354

[56] References Cited

U.S. PATENT DOCUMENTS

| | | | |
|---|---|---|---|
| 4,030,455 | 6/1977 | Van Eeck | 123/25 E |
| 4,212,728 | 7/1980 | Demmel | 208/113 |
| 4,290,392 | 9/1981 | Dissmore | 123/25 E |
| 4,300,483 | 11/1981 | Goodman | 123/25 A |
| 4,300,484 | 11/1981 | Goodman | 123/25 J |
| 4,382,017 | 5/1983 | Robinson et al. | 431/4 |
| 4,459,943 | 7/1984 | Goodman | 123/25 A |
| 4,461,245 | 7/1984 | Vinakur | 123/25 A |
| 4,499,862 | 2/1985 | Baumer et al. | 123/1 A |
| 4,502,420 | 3/1985 | Mezger | 123/25 C |
| 4,558,665 | 12/1985 | Sandberg | 123/25 A |
| 4,563,982 | 1/1986 | Pischinger | 123/25 A |
| 4,621,593 | 11/1986 | Rao et al. | 123/1 A |
| 4,639,209 | 1/1987 | Grethe | 431/4 |
| 4,714,066 | 12/1987 | Jordan | 123/25 A |
| 4,727,827 | 3/1988 | Hoffman et al. | 123/1 A |
| 4,862,836 | 9/1989 | Chen et al. | 123/3 |
| 5,007,381 | 4/1991 | Kakegawa | 123/1 A |
| 5,035,227 | 7/1991 | Hansen | 123/1 A |
| 5,100,642 | 3/1992 | Baycura | 123/1 A |
| 5,105,772 | 4/1992 | Olsson et al. | 123/1 A |
| 5,154,153 | 10/1992 | MacGregor | 123/538 |
| 5,167,782 | 12/1992 | Marlow | 123/538 |

*Primary Examiner*—E. Rollins Cross
*Assistant Examiner*—Erick Solis
*Attorney, Agent, or Firm*—Charles H. Thomas

[57] ABSTRACT

A new emission control system is described herein that injects liquid catalytic compounds into fossil fueled combustion devices for the purposes of reducing unhealthful emissions. The invention of the micrometering valve and injection nozzle assembly allows for the accurate, adjustable and controllable injection of minute quantities of liquid catalytic compounds. This injection means and method eliminates the chemical phase change as an integral part of the metering process. Liquid phase injection increases the selection of deliverable catalytic compounds, simplifies control and delivery equipment requirements and increases the potential range and functions of the invention. Liquid phase injection also offers the ability to utilize the combustion air stream, liquid or gaseous fuel stream or an alternate path delivering matter to the combustion process.

12 Claims, 4 Drawing Sheets

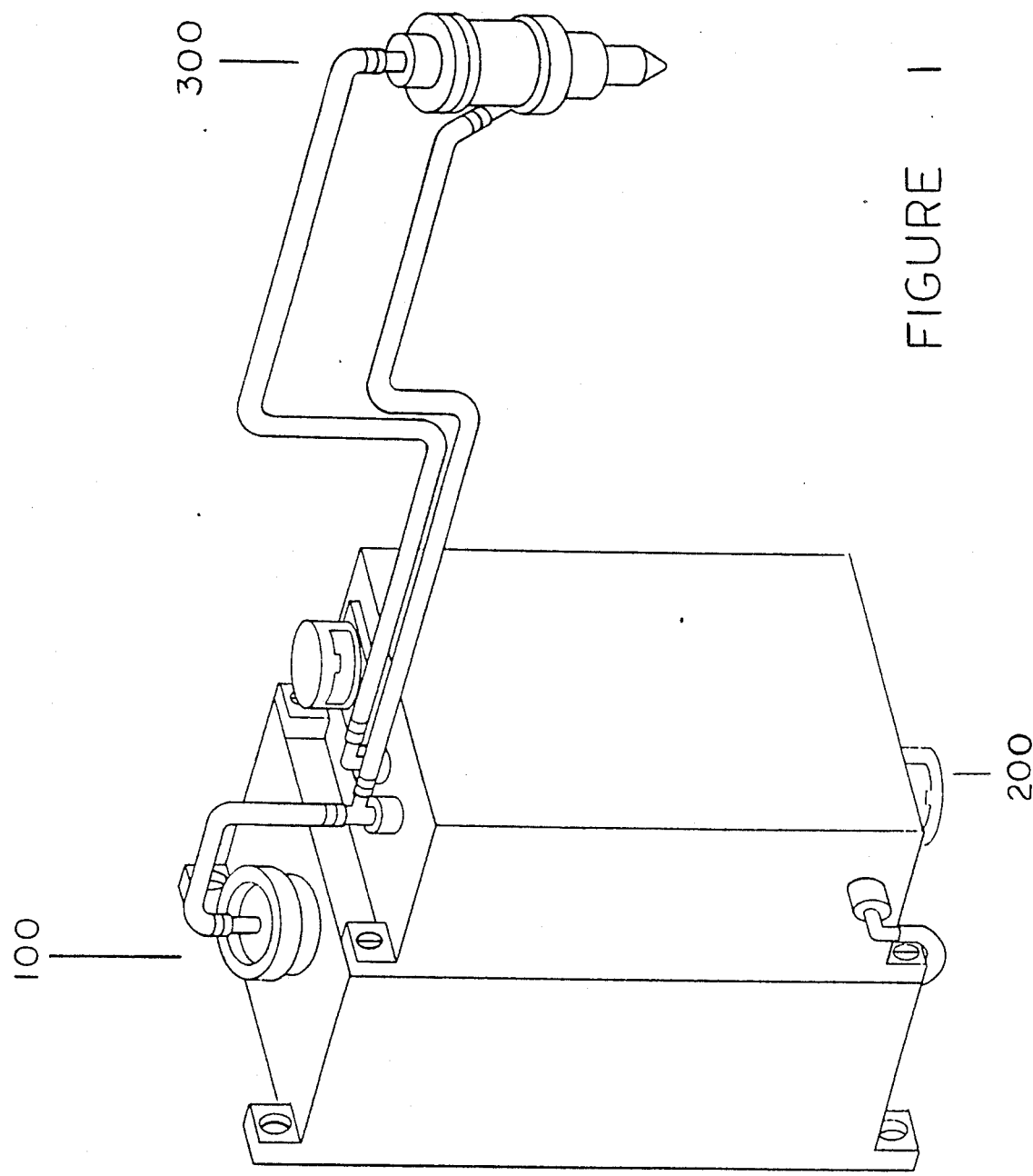

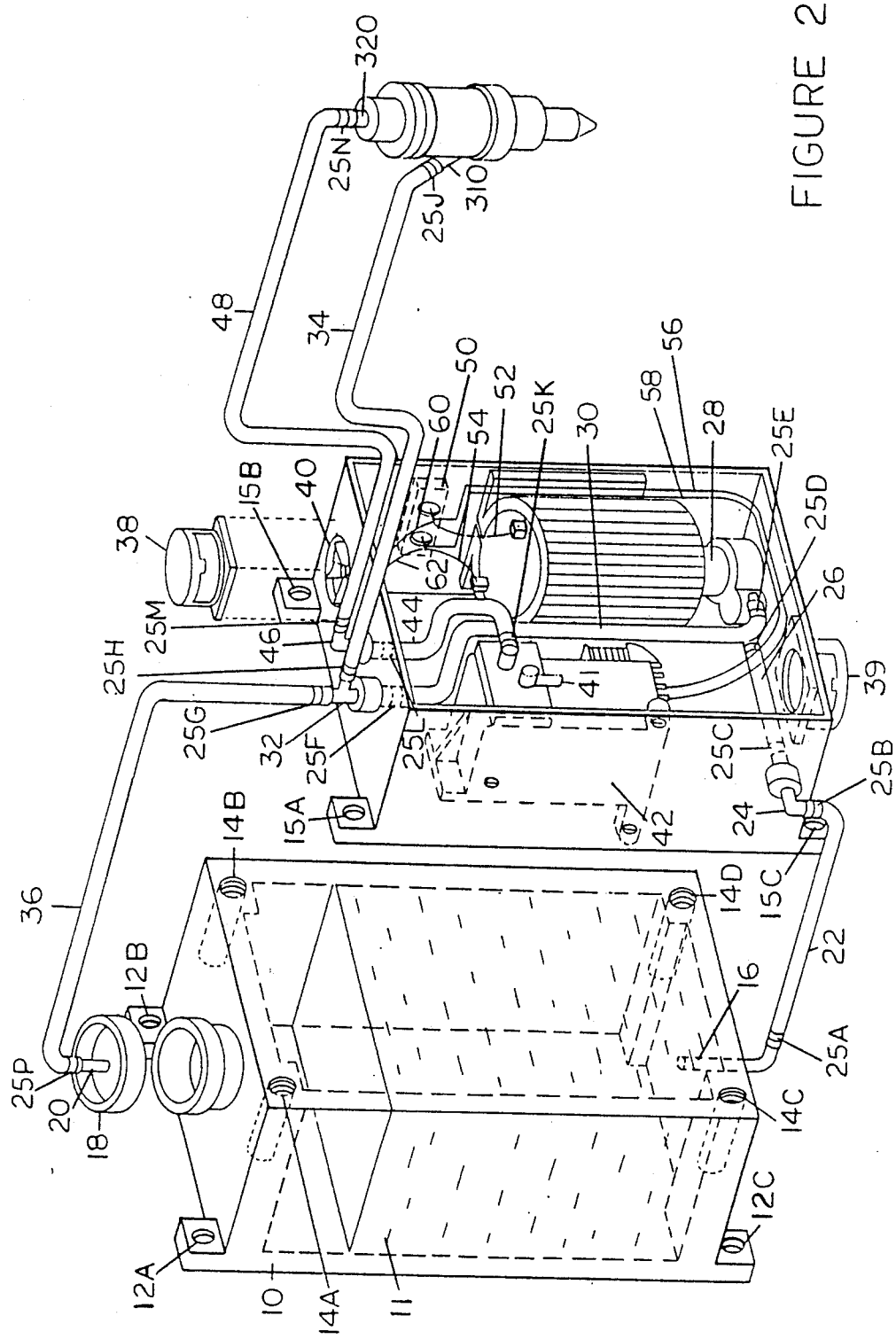

CATALYTIC LIQUID INJECTION SYSTEM FOR EMISSION CONTROL

BACKGROUND

1. Field of the Invention

This invention relates to a method and device for controlling the unhealthful and now regulated combustion products and byproducts emitted by fossil fueled combustion processes.

2. Cross-Reference to Related Applications

The following list is to applications which are related to the art of emission control:

| | |
|---|---|
| G. Kraus, Application #07/564,279 | Filed - August 8, 1990 |
| G. Kraus, et. al. Application #07/650,766 | Filed - February 4, 1991 |

3. Discussion of Prior Art

The following patents were reviewed as a reference to prior art;

| Patent Number | Name of Inventor | Date of Issue |
|---|---|---|
| 4,557,222 | H. Nelson | December 10, 1985 |
| 4,475,483 | Robinson | October 9, 1984 |
| 4,419,967 | A. C. Protacio, et. al. | December 13, 1983 |
| 4,362,130 | A. Robinson | December 7, 1982 |
| 4,306,520 | Slanton | December 22, 1981 |
| 4,166,435 | Kiang | September 4, 1979 |
| 4,090,838 | Schena, et. al. | May 23, 1978 |
| 4,016,837 | F. A. Wentworth, Jr. | April 12, 1977 |
| 4,014,637 | K. R. Schena | March 29, 1977 |
| 3,945,366 | R. I. Matthews | March 23, 1976 |
| 3,862,819 | F. A. Wentworth, Jr. | January 28, 1975 |
| 3,450,116 | A. D. Knight et. al. | June 17, 1969 |

Unhealthful emissions from combustion processes utilizing fossil fuels have long been the unwanted products and byproducts of using fossil fuels.

Concerns over the health risks posed by these unhealthful emissions have led the Government to enact regulations concerning air pollution. An example of such action is the 1990 Clean Air Act amendment. The enforcement arm of this legislation is the Environmental Protection Agency and the various Air Quality Management Agencies. These agencies are empowered to monitor and enforce limits on the amount of unhealthful emissions exhausted from fossil fueled devices located within their respective jurisdictions. Regulated combustion products and byproducts include oxides of nitrogen, carbon monoxide, particulate matter, soot, opacity and unburned or partially burned hydrocarbons.

All referenced prior art devices methods for introducing fuel additives or catalytic substances into the combustion air stream of a fossil fueled device have utilized a chemical phase change to accomplish this introduction. A chemical phase change is defined as going from a solid to a gas, a liquid to a gas, a solid to a liquid, etc.

A great many of the prior art devices have used water passing from the liquid phase to the gas phase as a combustion enhancement process, typically referring to the humidification of all or part of the combustion air stream. Sometimes chemicals are added to the evaporative process. Although of various design and operation, a common feature is the use of the mass transfer rate limitation as water or chemical passes though the phase change from liquid to gas to control the amount of water added to the combustion process. This mass transfer rate is dependent on a host of variables, including incoming air temperature and humidity, and the resultant inaccurate metering of the water injection rate caused uncertain benefits.

The controllability of this mass transfer between phases is complicated and has not been fully addressed in prior art catalyst delivery systems. However, these mass transfer variables are defined in any chemical engineering text on the subject.

For reference, Bennett and Myers, MOMENTUM, HEAT, AND MASS TRANSFER, 1962, relates how mass transfer within a phase is the tendency of a component in a mixture to travel from a region of high concentration to one of low concentration. Related by Fick's Law, this rate of travel is a function of the temperature, pressure, and the composition of the transfer medium, the amount of difference between the two concentration levels, and the cross-sectional area of the mass transfer path.

Mass transfer between phases is even more complicated, and is a function of even more variables.

In addition to the variables related above, mass transfer between phases is now a function of the interface between the phases as well as the relative physical properties between the two phases. For mass transfer to occur, the molecules must move through the first phase to the interface, cross the interface, and diffuse into the second phase away from the interface. Additional variables include the relative densities between the two phases, the surface tension forces at the interface, and the relative solubilities of the molecules in each phase. The relative velocities of the interface between the two phases is also a critical factor in the rate of mass transfer.

Prior art used mass transfer in a dynamic environment. Whether passing bubbles through a liquid or vaporizing a solid into a moving air stream, the mass transfer rates are affected by the presence of either turbulent or laminar flow at the phase interface. This causes the Reynold's number to become a variable that is itself a function of velocity, viscosity, density and interface geometry.

Thus the following shortcomings are encountered with prior art:

1. A chemical phase change has inherent inaccuracies in the metering process due to the number of variables that must be controlled in the mass transfer process when delivering minute quantities of a catalytic substance into a combustion process.

2. Control system and the associated equipment necessary to achieve the phase change or regulate mass transfer process variables for prior art devices are either unduly complicated or overlook critical variables.

3. Catalytic substances that may be introduced with prior art delivery systems have the limitations of:
   (a) Only those catalytic substances having the combined qualities of being stable as a solid, volatizable in a controllable manner, and stable in the resultant gas phase;
   (b) Only those catalytic substances having the combined qualities of being stable in an aqueous solution, absorbable in a controllable manner, and stable in the resultant gas phase.

4. Limitations of the conveyance path to only the combustion air steam as a practical means to transport the catalytic substance after the metering process to the combustion process.

OBJECTS AND ADVANTAGES

Accordingly, the objects and advantages of this invention over prior art occur because the catalytic liquid is stored, accurately metered and transported in a liquid phase to a conveyance path for entry into a combustion process and includes:

1. Significantly improving the accuracy and controllability for metering minute quantities of catalytic substance by eliminating a phase change of the catalytic substance as an inherent part of the metering process.

2. Significantly simplifying the control system and associated equipment by eliminating the requirements for controlling the phase change and mass transfer process variables and the equipment necessary to achieve the phase change.

3. Significantly extending the choices of catalytic substances that may be used with a direct liquid phase delivery system. The exact composition of the catalytic liquid is dependent on its intended function and the combustion device onto which it is installed. These catalytic substances are comprised of those elements and compounds known to increase the chemical reaction rates of hydrocarbon oxidation or the disassociation reaction rates of unhealthful combustion products and by products. These choice increases include:
   (a) Extending the choice of catalytic substances beyond those having the combined qualities of being stable as a solid, volatizable in a controllable manner, and stable in the resultant gas phase;
   (b) Extending the choice of catalytic substances beyond those having the combined qualities of being stable in an aqueous solution, absorbable in a controllable manner, and stable in the resultant gas phase;
   (c) Extending the choice of catalytic substances to include all those soluble in an aqueous and nonaqueous solvents to form a catalytic liquid;
   (d) Extending the choice of catalytic substance to include the transition elements of atomic numbers 21 through 30, 39 through 48 and 57 through 80 of the periodic table;
   (e) Extending the choice of catalytic substances to include all that are not stable as a solid or gas but can be stable when dissolved or complexed in a liquid solution;
   (f) Extending the choice of catalytic substances to include catalytic elements and compounds dissolved in a liquid that do not need to be purified and isolated into a solid before being used in this invention. This may allow lower cost industrial byproducts, such as spent plating solutions, to be used.

4. Significantly increasing the range of applications of the invention by increasing the number of conveyance paths that may be used to transport catalytic liquid to a combustion process, including:
   (a) the combustion air stream;
   (b) the gaseous fuel stream;
   (c) the liquid fuel stream;
   (d) alternate flow paths delivering matter to the area of combustion.

A further object and advantage is:
   (a) to extend the range of application, by improving the combustion efficiency of the combustion device in a manner that improves the fuel economy, improves rate of power output, improves the range of operation that otherwise cannot be sustained without the addition of catalytic liquid;
   (b) to extend the range of application so as to aid in the maintenance of the combustion device by extending the duration between or minimizing the scope of maintenance activity as well as extending the usable life of the combustion device;
   (c) to extend the range of application of this method and device as to work in conjunction with or as a replacement of other emission control techniques used to reduce regulated combustion products and byproducts;
   (d) that the accurate addition of catalytic liquid can be used to augment the effect of, or totally replace fuel additives such as Methyl Tertiary Butyl Ether (MTBE) used to reduce regulated combustion products and byproducts such as carbon monoxide. This augmentation or replacement of MTBE includes achieving the same benefits with less or even no MTBE blended into the fuel;
   (e) that the method and device used to accurately meter minute quantities of liquid is the micrometering valve and injection nozzle system described herein. This is a preferred embodiment of apparatus serving this function and may also be of alternate design, construction, materials or assembly;
   (f) that the control system for creating the variable inlet pressure at the micrometering valve and injection nozzle system may consist of simplified mechanical or electronic means for controlling the pressurizing device portion of the system;
   (g) the micrometering valve and injection nozzle system described herein may be of various size or plurality and can be either incorporated into the initial design of a combustion device or as an aftermarket retrofit to an existing combustion device, both options offering commercial viability;
   (h) the invention's intrinsic value of being inexpensively manufactured, easily maintained and expeditiously installed on most types of combustion devices including spark and compression ignited internal combustion engines, boilers, furnaces, and turbines.

A further object and advantage would be to use the means and methods described herein to precisely and controllably meter liquids into alternate, non-catalytic processes requiring additions of liquids at rates on the order of 4 ounces or less per hour. The slow addition of alternate liquid compositions could be used in the fields of medicine, lubrication, laboratory studies, food processing, as well as other industries. Still further objects and advantages will become apparent from a consideration of the ensuing description and drawings.

DRAWING FIGURES

FIG. 1 illustrates the main component assemblies of the catalytic injection system for emission control.

FIG. 2 illustrates the component structure of the main assemblies.

Figures 3A, 3B:
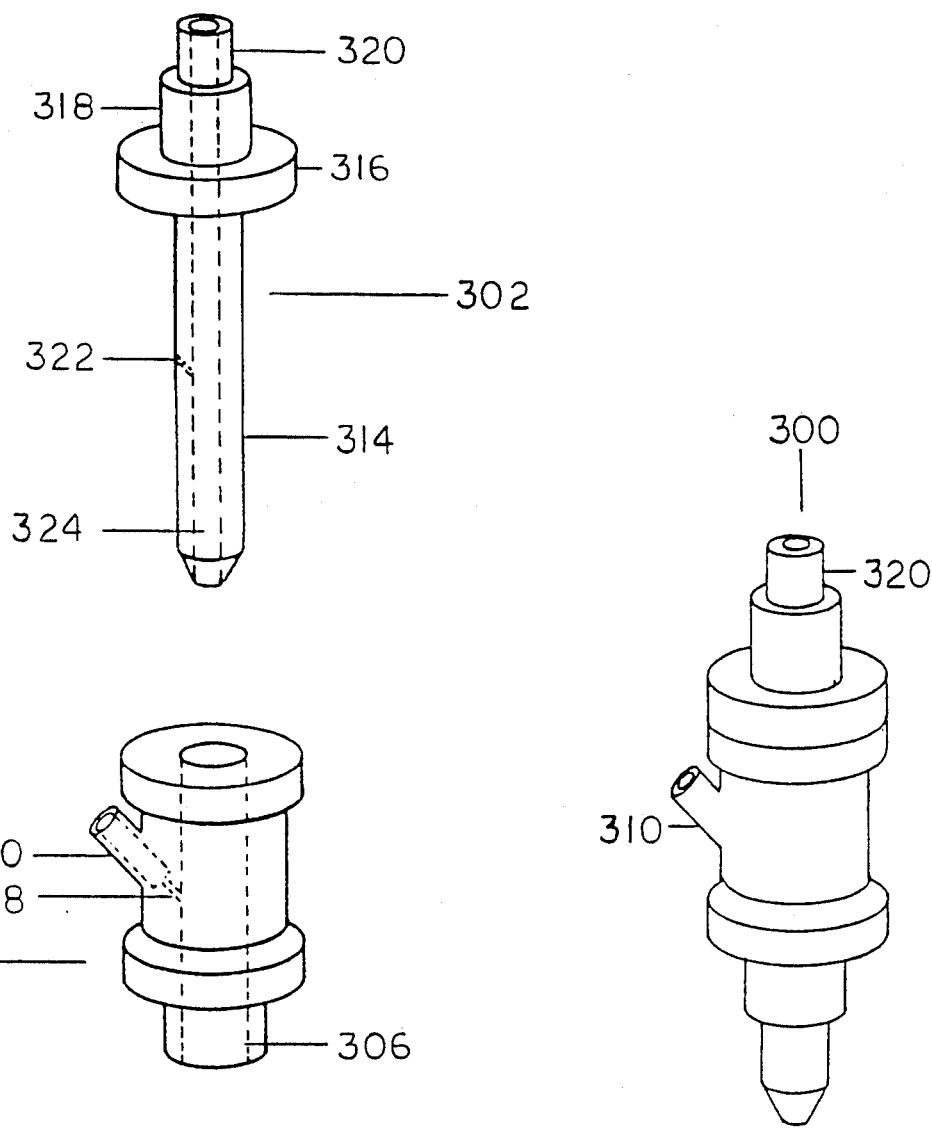
FIG. 3A illustrates the micrometering valve and injection nozzle assembly in an exploded view.
FIG. 3B illustrates the micrometering valve and injection nozzle assembly together.
Figure 4:
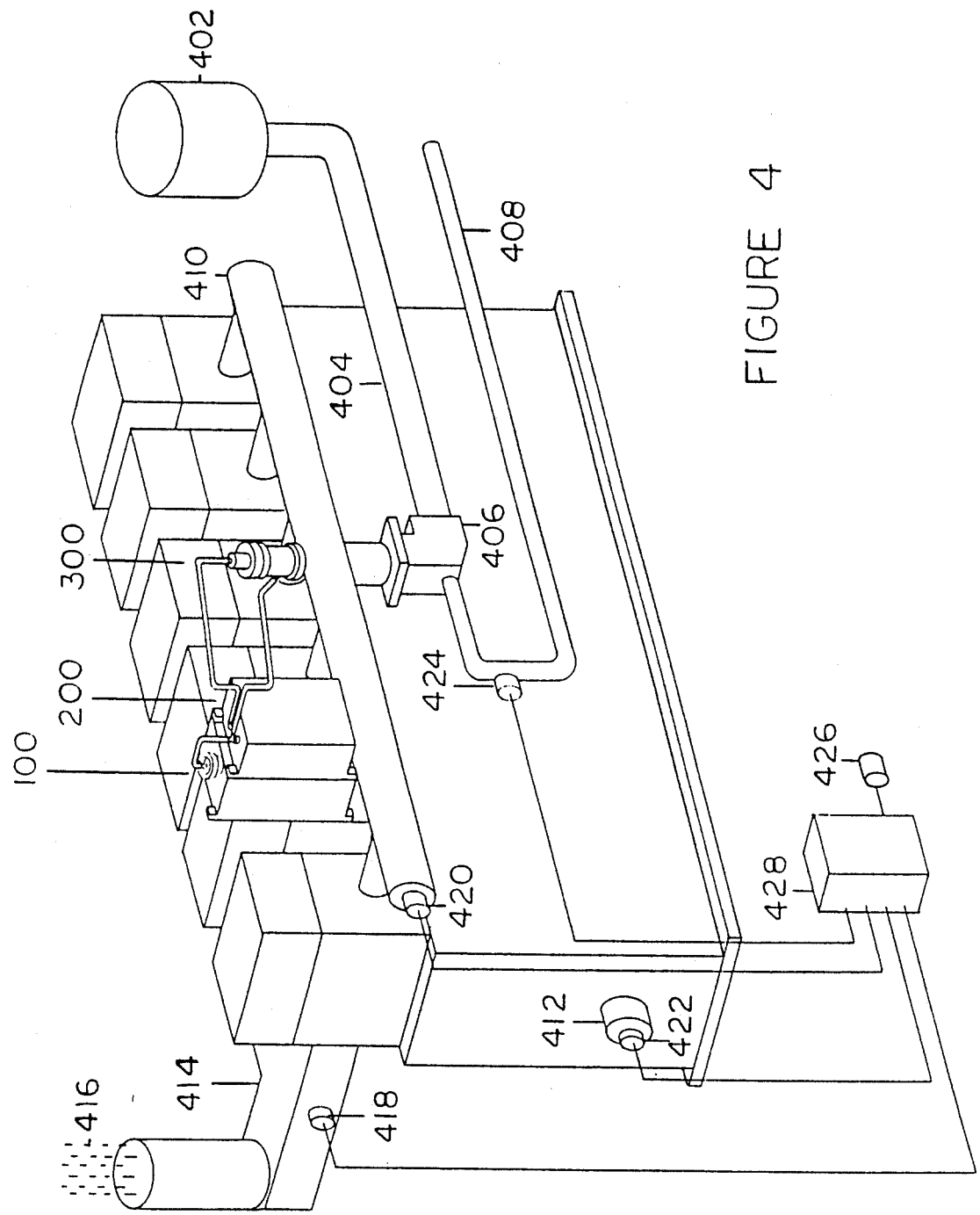
FIG. 4 illustrates a typical naturally aspirated engine, control system and typical installation of the catalytic injection system for emission control.

| | REFERENCE NUMERALS IN DRAWINGS |
|---|---|
| 10 | Reservoir |
| 11 | Catalytic Liquid |
| 12 A-D | Reservoir Mounting Flanges (12D not shown due to angle of drawing) |
| 14 A-D | Threaded Passages |
| 15 A-D | Panel Mounting Flanges (15D not shown due to angle of drawing) |
| 16 | Reservoir Outlet |
| 18 | Reservoir Fill Cap |
| 20 | Reservoir Return Connection |
| 22 | Reservoir Outlet Tube |
| 24 | Systems Panel Inlet Fitting |
| 25 A-P | Hose Clamps (Letters "I" and "O" omitted to prevent confusion) |
| 26 | Pump Suction Tube |
| 28 | Positive Displacement Pump |
| 30 | Pump Discharge Tube |
| 32 | Liquid Outlet Tee |
| 34 | Liquid Outlet Tube |
| 36 | Reservoir Return Tube |
| 38 | Air Filter |
| 39 | Air Filter |
| 40 | Cooling Fan |
| 41 | Air Pump Intake |
| 42 | Conveyance Air Pump |
| 44 | Air Pump Discharge Tube |
| 46 | Air Outlet Fitting |
| 48 | Conveyance Air Outlet Tube |
| 50 | Terminal Strip |
| 52 | Pump Positive Lead |
| 54 | Pump Negative Lead |
| 56 | Conveyance Air Pump Positive Lead |
| 58 | Conveyance Air Pump Negative Lead |
| 60 | Cooling Fan Positive Lead |
| 62 | Cooling Fan Negative Lead |
| 100 | Reservoir Assembly |
| 200 | Systems Panel Assembly |
| 300 | Micrometering Valve and Injection Nozzle |
| 302 | Nozzle Insert Assembly |
| 304 | Nozzle Body Assembly |
| 306 | Injection Nozzle Passage |
| 308 | Fluid Inlet Passage |
| 310 | Fluid Inlet Connection |
| 312 | *not used* |
| 314 | Injector Nozzle |
| 316 | Nozzle Insert Cap |
| 318 | Nozzle Adjustment Knob |
| 320 | Conveyance Air Inlet Connection |
| 322 | Liquid Inlet Passage |
| 324 | Conveyance Air Channel |
| 400 | Typical naturally aspirated engine |
| 402 | Air Filter |
| 404 | Air Inlet Pipe |
| 406 | Fuel Air Mixer |
| 408 | Fuel Supply Line |
| 410 | Intake Manifold |
| 412 | Power Output Shaft |
| 414 | Exhaust System |
| 416 | Combustion Products and Byproducts |
| 418 | Combustion Products and Byproducts Sensor |
| 420 | Manifold Depression Sensor |
| 422 | Power Output Sensor |
| 424 | Fuel Flow and Fuel Pressure Sensor |
| 426 | Manual Adjustment Sensor |
| 428 | Controller |

DETAILED DESCRIPTION OF THE INVENTION

FIG. 1 illustrates the main assemblies of the apparatus with which the method of the present invention is being practiced.

The invention accurately meters minute quantities of catalytic liquid without a chemical phase change, directly into the combustion process of a fossil fueled device to reduce the unhealthful products and byproducts of combustion processes.

The main assemblies of the preferred embodiment are: Reservoir assembly 100. Systems panel assembly 200, Micrometering valve and injection nozzle assembly 300.

FIG. 2 illustrates the component structure of the invention's main assemblies. Specifically, the reservoir 10 is appropriately sized to contain a reasonable quantity of catalytic liquid 11. Reservoir 10 of the preferred embodiment is 9.0" tall by 4.5" wide by 3.5" deep, and contains 2 liters of catalytic liquid 11. The specific size, shape and construction materials of reservoir 10 may vary depending upon application requirements.

Reservoir mounting flanges 12 A-D are incorporated to facilitate easy mounting (Note: 12D not shown due to angle of drawing). Threaded passages 14A-D are an integral part of the reservoir 10 and are appropriately spaced to match panel mounting flanges 15A-D (Note: 15D not shown due to angle of drawing) on systems panel assembly 200. This permits the reservoir assembly 100 and systems panel assembly 200 to be coupled together for installation. Should the space available for installation be limited, the reservoir assembly 100 and the systems panel assembly 200 may be separated and mounted independently. For independent mounting the systems panel assembly 200 should be mounted to maintain constant contact of catalytic liquid 11 with positive displacement pump 28.

The reservoir outlet 16 is located on the bottom of reservoir 10 and has reservoir outlet tube 22 attached. Tube 22 is routed to the systems panel inlet fitting 24 located on the systems panel assembly 200. Clamps 25A and B secure each end of tube 22. Connected to fitting 24 is pump suction tube 26 which terminates at positive displacement pump 28. Tube 26 is secured at each end by clamps 25C and D respectively.

The discharge outlet of pump 28 has pump discharge tube 30 attached. Tube 30 is routed and attached to the liquid outlet tee 32. Tube 30 is secured at tee 32 with clamp 25F and at pump 28 with clamp 25E. Attached to the middle outlet of tee 32 is the liquid outlet tube 34. Tube 34 terminates at the micrometering valve and injection nozzle assembly 300 at fluid inlet connection 310. Tube 34 is secured at each end by clamps 25H and 25J respectively. The top outlet of tee 32 has reservoir return tube 36 attached. Tube 36 is routed to and terminates at the reservoir return connection 20 located on reservoir fill cap 18. Tube 36 is secured at each end by clamps 25G and P respectively.

Located on systems panel assembly 200 is air filter 38. Filter 38 provides for filtered air to enter panel assembly 200 via cooling fan 40. The filtered air passes through the systems panel assembly 200 exiting through air filter 39. A portion of the filtered air entering panel assembly 200 is consumed by the conveyance air pump 42 via air pump intake 41. Air pump 42 pressurizes the air and discharges the air through air pump discharge tube 44. Tube 44 is attached to the air outlet fitting 46 and is secured to fitting 46 with clamp 25L and to air pump 42 with clamp 25K. The outboard portion of fitting 46 has air outlet tube 48 attached and secured with clamp 25M. Tube 48 terminates at conveyance air inlet connection 320 which is located on micrometering valve assembly 300. Tube 48 is secured at connection 320 with clamp 25N.

Terminal strip 50 has only 2 positions on it, one positive and one negative. Pump positive lead 52, conveyance air pump positive lead 56, and cooling fan positive lead 60 are all connected to the positive terminal of terminal strip 50. Pump negative lead 54, conveyance air pump negative lead 58 and cooling fan negative lead 62 are all connected to the negative position of terminal strip 50. The connections to the positive and negative positions of terminal strip 50 are soldered. An alternate to these basic electrical connections would be to route positive pump lead 52 and/or negative pump lead 54 to an alternate terminal strip to allow pump speed to be varied by a controlling device.

FIGS. 3A and 3B illustrate the micrometering valve and injection nozzle assembly 300. Micrometering valve and injection nozzle assembly 300 is constructed of Teflon (Teflon is a trademark of E. I. duPont deNemours & Co., Wilmington, Del.) and is fabricated in an unusual manner. The nozzle insert assembly 302 with an overall height of 2.940" has injector nozzle 314 machined to an outside diameter of 0.319". The nozzle insert cap 316 is machined to an outside diameter of 0.879" and a thickness of 0.280". Nozzle adjustment knob 318 has an outside diameter of 510" and is 0.250" thick. The conveyance air inlet connection 320 has an outside diameter of 0.219" and a height of 0.250" is directly above knob 318. The inside diameter on the vertical axis of nozzle insert assembly 302 is 0.031". Liquid inlet passage 322 is drilled at a 45° angle from the vertical plane and terminates by creating an entrance into conveyance air channel 324. The diameter of liquid inlet passage 322 is 0.015".

The nozzle body assembly 304 has an overall height of 1.785" with injection nozzle passage being 0.319" in diameter. The fluid inlet connection 310 has an outside diameter of 0.219" with a length of 0.280" and is positioned 45° from the vertical plane. The inside diameter of fluid inlet connection 310 is 0.156" and terminates into fluid inlet passage 308 which has a diameter of 0.015". The fluid inlet passage 308 is drilled at a 45° angle from the vertical plane and terminates by creating an entrance into the injection nozzle passage 306.

The length of injector nozzle 314 and nozzle body assembly 304 is determined by calculation considering that the exit point of fluid inlet passage 308 and the entrance point of liquid inlet passage 322 must be a minimum of 2 times the diameter of injector nozzle 314 away from the top and bottom of injector nozzle 314 and nozzle body assembly 304. This format ensures the prevention of unwanted leakage of catalytic liquid from any other portion of micrometering valve assembly 300.

The fabrication method of micrometering valve assembly 300 is unique and deserves mentioning. The nozzle body assembly 304 and nozzle insert assembly 302 are machined to the dimensions above, omitting the fluid inlet passage 308 and liquid inlet passage 322. After initial machining, the nozzle insert assembly 302 is placed in nozzle body assembly 304. The nozzle body assembly 304 is placed in the rotating chuck portion of a lathe. The nozzle insert assembly 302 is secured in a tail piece drill chuck which is stationary. The lathe is turned on allowing the nozzle body assembly 304 to rotate around the nozzle insert assembly 302 to create a lapping effect. After approximately 30 seconds of lapping the nozzle insert assembly 302 is slid back and forth in the nozzle body assembly 304 with the lathe still operating. This further laps the nozzle insert assembly 302 to the nozzle body assembly 304. The back and forth motion is only necessary for approximately 15 seconds. This process laps the nozzle assembly 304 to the nozzle insert assembly 302 thus creating the close tolerance passage.

With the nozzle insert assembly 302 completely inserted into the nozzle body assembly 304 drill the 45° fluid inlet passage 308 and liquid inlet passage 322 in the same motion. This ensures the proper positioning of these passages. Other angles can also be used. The nozzle fabricated under these guidelines allows for the fluid inlet passage 308 to be non aligned from the liquid inlet passage 322 which offers an annular flow path of high resistance between the outside diameter of injector nozzle 314 and the inside diameter of nozzle body 304. This resistance is not great enough to create leakage from undesired locations of the micrometering valve assembly 300, but allows for accurately metered minute amounts of catalytic liquid to flow in a thin film and be delivered to the conveyance air channel 324.

The micrometering valve 300 fabricated to the dimensions listed, can deliver in accurately metered amounts, a range of fluid flow rates between 0.8 milliliters to 80 milliliters per hour. The increase or decrease in the physical size of micrometering valve assembly 300 and proper selection of pump 28 will make the delivery rates and adjustment capabilities unlimited.

It is also envisioned that commercial production of micrometering valve and injection nozzle assembly 300 could be accomplished with injection molding or other processes which would offer the ability to omit certain steps as described above.

DETAILED DESCRIPTION OF OPERATION

The function of reservoir 10 is to store an amount of catalytic liquid 11 adequate to extend the replenishment cycle to a convenient and practical interval. The preferred embodiment has a reservoir capacity of 2 liters, enough for an estimated 1 year of typical automobile operation. The concentration of catalytic elements and compounds contained in the catalytic liquid 11 can be varied to maintain a one year replenishment cycle for different applications as well as varying the size of the reservoir. Alternate replenishment cycles could also be implemented.

Catalytic liquid 11 exits the bottom of reservoir 10 through reservoir outlet 16 into reservoir outlet tube 22. From tube 22 the catalytic liquid 11 enters and passes through systems panel inlet fitting 24 to pump suction tube 26. From suction tube 26 the catalytic liquid 11 enters the suction side of positive displacement pump 28 and is pressurized. The pressurized catalytic liquid 11 is discharged from pump 28 through pump discharge tube 30. Tube 30 is connected to the bottom of liquid outlet tee 32. Most of the pressurized catalytic liquid 11 returns to reservoir 10 via the top connection of tee 32, reservoir return tube 36 and reservoir return connection 20. The purpose of returning pressurized catalytic liquid 11 to the reservoir 10 is twofold. The first function is to recycle the excess pressurized catalytic liquid 11 not entering micrometering valve assembly 300. Without this recycling process an expensive, extremely small pump would be required to pressurize and deliver only the catalytic liquid 11 required at the micrometering valve assembly 300. The second function is to provide agitation to the catalytic liquid 11 stored in reservoir 10 which ensures a homogeneous blend of catalytic liquid 11. Only a small fraction of the pressurized catalytic liquid 11 actually enters the micrometering valve and injection nozzle assembly 300 by way of the middle outlet of tee 32 to which liquid outlet tube 34 is connected. Tube 34 completes the path for the catalytic liquid 11 by terminating at the fluid inlet connection 310.

Conveyance air is also supplied to micrometering valve assembly 300 by conveyance air pump 42. The air entering the conveyance air pump intake 41 is a portion of the filtered air entering the systems panel assembly 200 via air filter 38. The filtered air is drawn through air filter 38 by cooling fan 40. Air pump 42 pressurizes the filtered air and discharges it through air pump discharge tube 44. Tube 44 is attached to air outlet fitting 46. Air outlet tube 48 is attached to the top portion of fitting 46 and terminates at conveyance air connection 320.

The function of the conveyance air in the preferred embodiment is also twofold. First, to disperse the catalytic liquid 11 entering the conveyance air channel 324 via the liquid inlet passage 322 into fine droplets. Second is to convey the fine droplets to a path for transport to the combustion zone of the combustion device.

The size of the fine droplets, which are measured in microns, is partially determined by the velocity of the conveyance air passing through air channel 324. Air pump 42 provides a flow of 2 liters per minute through the conveyance air channel. This flow rate creates an adequate velocity to ensure reasonable droplet size, given micrometering valve assembly 300 is fabricated to the dimensions outlined above.

Alternate methods of dispersement and conveyance depends on the path selected for transport to the combustion process. For instance, dispersement and conveyance methods may include any relatively high velocity stream that is compatible with the chosen transport path to the combustion zone. These dispersement and conveyance paths may include the gaseous or liquid fuel stream, the mixed air and fuel stream as well as the combustion air stream. Virtually any dispersement and conveyance path that delivers matter to the combustion zone is practical and acceptable.

The source of the high velocity dispersement and conveyance stream can consist of a slipstream of existing air, fuel, or a mixture of air and fuel flowing to the combustion zone. Pressure to achieve the high velocity needed can either be induced by the equipment contained in the invention, such as air pump 42, or generated by the natural operating processes of the combustion device.

Adjusting the amount of catalytic liquid 11 entering micrometering valve assembly 300 is accomplished by rotating the nozzle insert assembly 302 in the nozzle body assembly 304, thus moving the liquid inlet passage 322 further from the fluid inlet passage 308. This increases the resistance path and thus reduces the rate of catalytic liquid entering conveyance air channel 324, given the same inlet pressure to micrometering valve 300. By rotating the nozzle insert assembly 302 so the liquid inlet passage 322 is closer to the fluid inlet passage 308, the path of resistance is decreased for the catalytic liquid which, in turn increases the rate delivered to the conveyance air channel 324 given the same inlet pressure to micrometering valve 300. The inlet pressure can also be varied with a control system at a given satic position of micrometering valve assembly 300 which will change the delivery rate of catalytic liquid 11.

It is envisioned that the micrometering valve and injection nozzle assembly 300 described herein may also be of alternate design, construction, materials or assembly. The micrometering valve assembly 300 described herein may be of various size or plurality to accomplish this function and can be applied either in the initial design of the combustion device or as an aftermarket retrofit to an existing combustion device.

The control system for the invention is extremely versatile and readily adaptable to specific applications. The variable inlet pressure can be accomplished by varying the speed of positive displacement pump 28. The discharge pressure of the pump increases and decreases as a function of the pump speed. These increases and decreases create increases and decreases of the inlet pressure to micrometering valve assembly 300 with the end result being accurately controlled increases and reductions in the amount of catalytic liquid 11 delivered to the combustion process.

FIG. 4 illustrates a typical naturally aspirated engine 400 and the control system which monitors a variety of engine operating parameters or the emission rate of one or more of the combustion products or byproducts. Also depicted in this illustration is a typical installation of a catalytic injection system for emission control. The reservoir assembly 100 with systems panel assembly 200 attached is installed on the outboard portion of intake manifold 410 with the micrometering valve and injection nozzle assembly 300 installed in the air inlet pipe 404.

Briefly, engine 400 requires air for combustion which initially enters through air filter 402 flowing through air inlet pipe 404 to the fuel air mixer 406. The fuel is supplied by fuel supply line 408 which terminates at fuel air mixer 406. The appropriate mixture of fuel and air is drawn into the intake manifold 410. The combustion process occurs when the fuel air mixture enters the combustion zone and is compressed and ignited. The power supplied by the combustion process in this instance, is translated to the power output shaft 412. After the combustion process, combustion products and byproducts 416 exit the engine through the exhaust system 414.

Controller 428 which is capable of supplying an output signal is utilized. The input signals to controller 428 can be from a sensor or sensors monitoring single or multiple operating parameters or single or multiple emission rates. For example, sensor 420 is monitoring the intake manifold depression, which would be an indication of the engine load as well as an indirect indication of fuel consumption. The fluctuations in manifold depression are monitored by sensor 420 which signals controller 428 of these fluctuations. Controller 428 is connected to the positive displacement pump 28 (pictured in FIG. 2) located in systems panel assembly 200. This allows the output signal from controller 428 to increase or decrease the speed of pump 28. The fluctuations in the speed of pump 28 results in a varying inlet pressure of the catalytic liquid 11 to micrometering valve assembly 300 providing for accurate metering of catalytic liquid 11 to the combustion process.

Examples of other sensors monitoring the engine's operating parameters included in this illustration are power output sensor 422, fuel flow and fuel pressure sensor 424. One or more of the combustion products and byproducts 416 exhausted from the combustion process can be monitored by attaching a sensor to exhaust system 414. Sensor 418 can monitor these fluctuations and supply a signal to controller 428. Sensor 426 attached to controller 428 allows for a manual adjustment output signal to vary the speed of pump 28.

The control system for adjusting the catalytic liquid flow to the micrometering valve assembly 300 may also be of alternate design, construction, materials or assembly. Alternate means of adjusting the flow could include a control valve assembly or a restrictor orifice on reservoir return tube 36. A control valve assembly or restrictor orifice could be used on liquid outlet tube 34. A restrictor orifice effect can also be created by selecting various diameters and lengths of tubing. This selection process would be applicable to both liquid outlet tube 34 and reservoir return tube 36. An actuator on the micrometering valve assembly 300 to rotate the nozzle adjustment knob 318 could also be utilized to control the catalytic liquid flow.

Control signals to initiate changes in the delivery rate of catalytic liquid 11 can be generated electronically or mechanically by monitoring one or more of the operating parameters of the combustion device such as speed, fuel pressure, torque, generator power output, load, oil pressure, fuel flow, temperature, manifold vaccum pressure and turbocharger discharge pressure.

Control signals to initiate changes in the delivery rate of catalytic liquid 11 can be generated electronically or mechanically by monitoring one or more of the emission rates of combustion products and byproducts in the exhaust of the combustion device.

The choice of catalytic substance dissolved in the solvent to form catalytic liquid 11 can vary depending on the application and the combustion device. The range and selection of catalytic elements or compounds extends to all those known to increase the chemical reaction rates of hydrocarbon oxidation or the disassociation reaction rates of unhealthful combustion products and byproducts. This extension includes all those soluble in an aqueous or nonaqueous solvents to form a catalytic liquid. This also includes those catalytic substances that are not stable as a solid or gas but can be stable when dissolved or complexed in a liquid solution. It is envisioned that the use of directly injected catalytic liquid also provides the opportunity to utilize less expensive catalytic elements obtained from other industrial processes, such as spent plating solution, because it is not necessary to first extract the catalytic elements as a solid.

The catalytic elements or compounds are envisioned to be, but not limited to, one or more of the transition elements of atomic numbers 21 through 30, 39 through 48 and 57 through 80 of the periodic table. These elements are recognized, especially the group VIII elements, with catalytic properties over a broad range of chemical reactions and reaction conditions.

Of note are the transition element compounds of tetraamine platinum dichloride, tetraamine palladium dichloride and nickel chloride. These compounds are relatively inexpensive and stable in aqueous and nonaqueous solvents. The use of catalytic liquid allows for equal distribution of small amounts of catalytic elements or compounds within the solvent. This is necessary because extremely low rates are needed in a commercially viable emission reduction process. These catalytic liquid delivery rates are often expressed as a ratio of parts per billion by weight compared to fuel consumption rates. Homogenous blending of more than one catalytic element of compound is also provided by the liquid phase storage and delivery system. The ability to change the concentration of the catalytic elements or compounds in the solvent can increase the range of applicability of the invention without requiring hardware modifications to increase catalytic liquid delivery rates. It also provides the capability of concentrating the catalytic liquid for ease of storage or shipping.

The solvents selected to contain the catalytic elements or compounds in a homogenous mixture may also have the ability to reduce the amount of unhealthful emissions when delivered to the combustion zone. Fuels containing molecularly bound oxygen have recently been mandated by the Clean Air Act of 1990 in some of the urban areas to reduce carbon monoxide emissions during winter driving seasons. Solvents containing molecularly bound oxygen are envisioned to have a similar effect. However, it is also envisioned that the volume of solvent used to achieve a reduction of unhealthful emissions is decreased with the addition of catalytic elements or compounds to the solvent. The efficiency of a solvent addition process can thereby be increased, thus decreasing the overall operating costs.

A similar envisionment is made with fuel additives. The volume of a fuel additive, such as Methyl Tertiary Butyl Ether (MTBE), used to achieve a reduction of unhealthful emissions is decreased with the addition of catalytic elements or compounds. These same benefits may be achievable with only the proper selection of catalytic substances, solvents and injection rates.

The independent action of the invention is to work in conjunction with or as a replacement of other emission control techniques used to reduce regulated combustion products and byproducts.

It is envisioned that this method of adding catalytic compounds to the combustion process may also used to improve the fuel economy as well as reducing the emission of unhealthful combustion products and byproducts. Certainly the effect of emitting less hydrocarbons indicates that more energy is being obtained from the same quantity of fuel. The hydrocarbons formally in the exhaust are now consumed in the combustion process to provide more useful work from a given amount of fuel.

It is also envisioned that this method of adding catalytic compounds the the combustion process may also be used for increasing the rate of power output obtained from the combustion device. The benefits of adding catalytic compounds allows more fuel to be advantageously burned within the operating parameters of the combustion device than would otherwise be possible.

It is also envisioned that this method of adding catalytic compounds to the combustion process may also be used for extending the operation of a combustion device in a manner that would not be possible without the addition of the catalytic compounds. Sustained operation of the combustion device under these extended operating conditions could well fail if the addition of catalytic compounds was ceased during operation.

It is also envisioned that this method of injecting catalytic compounds to the combustion process may also be used to aid in the combustion device maintenance by extending the duration between or minimizing the scope of maintenance as well as extending the usable life cycle by injecting properly selected liquid phase catalytic compounds. The benefits of adding properly selected liquid phase catalytic compounds may include reduced contamination of lubricating oils, reduced wear of combustion device components thus extending the operating time required before maintenance servicing.

A final envisionment is that this method and means described herein to precisely and controllably meter catalytic liquids into a combustion process may also be used for alternate, noncatalytic processes requiring continuous additions of liquids at slow addition rates. Slow addition of liquids could be used in the fields of medicine, lubrication, food processing and other industries.

EXAMPLE

A catalytic liquid injection system was constructed according to the present invention in which the positive displacement pump 28 used was a Greylor model PD-12DC (Greylor Elgin, Ill.). The conveyance air pump 42 was a Schwartz model SG, (Schwartz—Germany) and cooling fan 40 was an Archer model 273-244A (Archer is a trademark of the Tandy Corporation Dallas, Tx.)

A micrometering valve and injection nozzle assembly was fabricated as described herein.

The reservoir assembly 100 was fabricated using ¼" and ⅛" Plexiglas stock. The opening in which fill cap 18 was positioned on was fabricated from 2" polyvinyl chloride. The catalytic liquid contained 10 grams of Tetraamineplatinum dichloride in 2 liters of distilled water. Supplier for this chemical was Johnson Matthey bearing the part number 10836 (Johnson Matthey Ward Hill, Mass.)

Testing was conducted on an 8 horsepower Briggs & Stratton Model 190432-0287-01 Code 87012209 gasoline powered engine with a 6000 watt close coupled generator. The test results were obtained using a range of load conditions consisting of 6000 watts, 4000 watts and 2000 watts with an injection rate of 2 milliliters per hour. The carbon monoxide and the unburned hydrocarbon emission levels although fluctuating, maintained a minimum reduction level of 30% throughout the load ranges.

The Briggs & Stratton 8 horsepower engine was then converted to natural gas and the same injection rate was used. The results were similar to those obtained with gasoline. The carbon monoxide was somewhat more stable throughout the load ranges and a reduction of not less than 30% of carbon monoxide and unburned hydrocarbon emission levels was also obtained.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A device for injecting a catalytic liquid for reducing unhealthful emissions into the combustion zone of an internal combustion engine wherein said catalytic liquid comprises a dissolved catalytic compound selected from the group consisting of tetraamine platinum dichloride, tetraamine palladium dichloride and nickel chloride, comprising:
   a storing means for storing said catalytic liquid in a reservoir;
   a controlling means to accurately meter the amount of said catalytic liquid into said combustion zone of said internal combustion engine; and
   a transporting means for conveying catalytic liquid from said reservoir through said controlling means into said combustion zone of said internal combustion engine.

2. A device for injecting a catalytic liquid for reducing unhealthful emissions into the combustion zone of an internal combustion engine comprising:
   a storing means for storing said catalytic liquid in a reservoir;
   a controlling means to accurately meter the amount of said catalytic liquid into said combustion zone of said internal combustion engine and including micrometering valving means to restrict the flow of catalytic liquid and having a liquid inlet passage connected to a close tolerance passage between two surfaces positioned substantially together to a nonaligned liquid outlet passage, whereby said liquid flows in a thin film through said close tolerance passage between said nonaligned liquid inlet and outlet passages;
   pressurizing means for creating a variable liquid inlet pressure at said micrometering valving means to adjust the flow of said catalytic liquid; and
   a transporting means for conveying said catalytic liquid from said reservoir through said controlling means into said combustion zone of said internal combustion engine.

3. A device for injecting a catalytic liquid for reducing unhealthful emissions into the combustion zone of an internal combustion engine comprising:
   a storing means for storing said catalytic liquid in a reservoir;
   a controlling means to accurately meter the amount of said catalytic liquid into said combustion zone of said internal combustion engine and including micrometering valving means to restrict the flow of catalytic liquid comprising a liquid inlet passage connected to a close tolerance passage between two surfaces positioned substantially together to a nonaligned liquid outlet passage, whereby said liquid flows in a thin film through said close tolerance passage between said nonaligned liquid inlet and outlet passages, and
   pressurizing means for creating a variable differential pressure across said micrometering valving means, to adjust flow of said catalytic liquid; and
   a transporting means for conveying said catalytic liquid from said reservoir through said controlling means into said combustion zone of said internal combustion engine.

4. A device for injecting a catalytic liquid for reducing unhealthful emissions into the combustion zone of an internal combustion engine comprising:
   a storing means for storing said catalytic liquid in a reservoir;
   a controlling means to accurately meter the amount of said catalytic liquid into said combustion zone of said internal combustion engine and including means for determining the emission rates of combustion products and byproducts and means for adjusting said catalytic liquid flow as a function of said determined emission rates; and
   a transporting means for conveying catalytic liquid from said reservoir through said controlling means into said combustion zone of said internal combustion engine.

5. A device for injecting a catalytic liquid for reducing unhealthful emissions into the combustion zone of an internal combustion engine comprising:
   a storing means for storing said catalytic liquid in a reservoir;
   a controlling means to accurately meter the amount of said catalytic liquid into said combustion zone of said internal combustion engine and including means for determining combustion air temperature to said internal combustion engine and means for adjusting said catalytic liquid flow as a function of said combustion air temperature; and a transporting means for conveying catalytic liquid from said reservoir through said controlling means into said combustion zone of said internal combustion engine.

6. A device for injecting a catalytic liquid for reducing unhealthful emissions into the combustion zone of an internal combustion engine comprising:

a storing means for storing said catalytic liquid in a reservoir;

a controlling means to accurately meter the amount of said catalytic liquid into said combustion zone of said internal combustion engine and including means for determining exhaust gas temperature of said internal combustion engine and means for adjusting said catalytic liquid flow as a function of said exhaust gas temperature; and a transporting means for conveying catalytic liquid from said reservoir through said controlling means into said combustion zone of said internal combustion engine.

7. A method for injecting catalytic liquid for reducing unhealthful emissions into the combustion zone of an internal combustion engine comprising the steps of:

selecting a catalytic liquid capable of creating a reduction of unhealthful emissions from an internal combustion engine from the group consisting of tetraamine platinum dichloride, tetraamine palladium dichloride and nickel chloride;

storing said catalytic liquid in a reservoir;

transporting said catalytic liquid from said reservoir to said internal combustion engine; and controlling and accurately metering the amount of said catalytic liquid into said internal combustion engine.

8. A method for injecting catalytic liquid for reducing unhealthful emissions into the combustion zone of an internal combustion engine comprising the steps of:

selecting a catalytic liquid capable of creating a reduction of unhealthful emissions from an internal combustion engine;

storing said catalytic liquid in a reservoir;

transporting said catalytic liquid from said reservoir to said internal combustion engine;

controlling and accurately metering the amount of said catalytic liquid into said internal combustion engine using a micrometering valve wherein said flow of catalytic liquid is restricted as it passes through a liquid inlet passage connected to a close tolerance passage between two surfaces positioned substantially together to a nonaligned liquid outlet passage between said nonaligned liquid inlet and outlet passages; and varying the liquid inlet pressure at said micrometering valve, thereby adjusting the flow of catalytic liquid.

9. A method for injecting catalytic liquid for reducing unhealthful emissions into the combustion zone of an internal combustion engine comprising the steps of:

selecting a catalytic liquid capable of creating a reduction of unhealthful emissions from an internal combustion engine;

storing said catalytic liquid in a reservoir;

transporting said catalytic liquid from said reservoir to said internal combustion engine;

controlling and accurately metering the amount of said catalytic liquid into said internal combustion engine using a micrometering valve wherein said flow of catalytic liquid is restricted as it passes through a liquid inlet passage connected to a close tolerance passage between two surfaces positioned substantially together to a nonaligned liquid outlet passage between said nonaligned liquid inlet and outlet passages; and varying the differential pressure across said micrometering valve, thereby adjusting the flow of catalytic liquid.

10. A method for injecting catalytic liquid for reducing unhealthful emissions into the combustion zone of an internal combustion engine comprising the steps of:

selecting a catalytic liquid capable of creating a reduction of unhealthful emissions from an internal combustion engine;

storing said catalytic liquid in a reservoir;

transporting said catalytic liquid from said reservoir to said internal combustion engine;

controlling and accurately metering the amount of said catalytic liquid into said internal combustion engine; and determining the emission rates of combustion products and byproducts from said internal combustion engine and adjusting said catalytic liquid flow as a function of said determined emission rates.

11. A method for injecting catalytic liquid for reducing unhealthful emissions into the combustion zone of an internal combustion engine comprising the steps of:

selecting a catalytic liquid capable of creating a reduction of unhealthful emissions from an internal combustion engine;

storing said catalytic liquid in a reservoir;

transporting said catalytic liquid from said reservoir to said internal combustion engine;

controlling and accurately metering the amount of said catalytic liquid into said internal combustion engine; and determining the combustion air temperature of said internal combustion engine and adjusting catalytic liquid flow as a function of said combustion air temperature.

12. A method for injecting catalytic liquid for reducing unhealthful emissions into the combustion zone of an internal combustion engine comprising the steps of:

selecting a catalytic liquid capable of creating a reduction of unhealthful emissions from an internal combustion engine;

storing said catalytic liquid in a reservoir;

transporting said catalytic liquid from said reservoir to said internal combustion engine;

controlling and accurately metering the amount of said catalytic liquid into said internal combustion engine;

determining exhaust gas temperature of said internal combustion engine; and adjusting flow of said catalytic liquid as a function of said determined exhaust gas temperature.

* * * * *